United States Patent
Coker et al.

(10) Patent No.: US 6,625,235 B1
(45) Date of Patent: Sep. 23, 2003

(54) APPARATUS AND METHOD FOR NOISE-PREDICTIVE MAXIMUM LIKELIHOOD DETECTION

(75) Inventors: Jonathan D. Coker, Rochester, MN (US); Richard L. Galbraith, Rochester, MN (US); Evangelos S. Eleftheriou, Zurich (CH); Walter Hirt, Wettswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/403,628

(22) PCT Filed: May 15, 1997

(86) PCT No.: PCT/IB97/00554

§ 371 (c)(1),
(2), (4) Date: Nov. 2, 1999

(87) PCT Pub. No.: WO98/52330

PCT Pub. Date: Nov. 19, 1998

(51) Int. Cl.$^7$ ................................................ H03D 1/00
(52) U.S. Cl. ...................... 375/341; 375/350; 714/795; 360/65
(58) Field of Search ................................. 375/262, 263, 375/264, 265, 290, 341, 350; 714/794, 795; 360/65

(56) References Cited

U.S. PATENT DOCUMENTS

| | | | | |
|---|---|---|---|---|
| 5,115,452 A | * | 5/1992 | Cupo | |
| 5,784,415 A | * | 7/1998 | Chevillat et al. | 375/341 |
| 5,818,876 A | * | 10/1998 | Love | 375/341 |
| 5,867,531 A | * | 2/1999 | Shiino et al. | 375/262 |
| 6,029,058 A | * | 2/2000 | Namgoong et al. | 455/324 |

FOREIGN PATENT DOCUMENTS

| | | |
|---|---|---|
| JP | 01-218150 | 8/1989 |
| JP | 05-007128 | 1/1993 |
| JP | 06-020208 | 1/1994 |
| JP | 07-006511 | 1/1995 |
| JP | 07-015355 | 1/1995 |
| JP | 07-038614 | 2/1995 |

* cited by examiner

Primary Examiner—Jean B. Corrielus
(74) Attorney, Agent, or Firm—Matthew J. Bussan; Roy W. Truelson (57) ABSTRACT

In a maximum likelihood sequence detector for symbol sequences which were equalized in a PR4 equalizer, noise prediction means (35) are provided including infinite impulse response (IIR) filtering, which have noise-whitening capabilities and are imbedded into the maximum likelihood detection process. The resulting INPML detector (10) can be implemented in digital or analog circuit technology. In addition, a DC-notch filter (44a) and a stochastic gradient procedure can be provided for DC offset compensation and for MR head or signal asymmetry compensation.

17 Claims, 9 Drawing Sheets

| Addresses | RAM | Contents | Nominal Values |
|---|---|---|---|
| $\hat{a}_{n-d}$  $\hat{a}_{n-2-d}$ | | | |
| −1, −1 → | 0 → | $\hat{f}(-1, -1)$ | 0 |
| −1, +1 → | 1 → | $\hat{f}(-1, +1)$ | −2 |
| +1, −1 → | 2 → | $\hat{f}(+1, -1)$ | +2 |
| +1, +1 → | 3 → | $\hat{f}(+1, +1)$ | 0 |

APPARATUS AND METHOD FOR NOISE-PREDICTIVE MAXIMUM LIKELIHOOD DETECTION

This application is a 371 of PCT/IB97/00554 filed May 15, 1998.

BACKGROUND OF THE INVENTION

1. Field of the Invention

Present invention relates to data detection apparatus and methods. It is in particular applicable to direct access storage (DASD) devices using partial-response (PR) signaling and maximum likelihood sequence detection (MLSD).

2. Background Information

In DASD systems as well as in data transmission systems, the signal read from the storage device or received at the output of a transmission channel has to be converted in the receiver into a sequence of symbols which most likely represents the data (symbol) sequence initially stored or transmitted by the sender, despite interference between adjacent symbols, and despite added noise.

The optimum receiver for detecting an uncoded data sequence in the presence of inter-symbol interference (ISI) and noise consists of a whitened-matched filter followed by a Viterbi detector which performs maximum likelihood sequence detection on the ISI trellis. In PRML (Partial-Response Maximum Likelihood) systems the composite noise at the input of the detector is not white, resulting in sub-optimal performance. This sub-optimality is more pronounced at high recording densities since the linear PR4 (PR class 4) equalizer tends to enhance the electronic noise component of the composite noise at the input of the PRML detector. In addition to colored noise, nonlinear distortion due to non-linear bit-shift and head asymmetry could further degrade performance of PRML systems.

International Patent Application PCT/WO97/11544 (IBM) discloses a scheme for data detection in a direct access storage device, called NPML (Noise-Predictive Maximum Likelihood detection), that arises by imbedding a noise prediction/whitening filter into the branch metric computation of the Viterbi detector. It has been shown via simulations that the NPML detectors offer substantial performance gains over the PRML detectors.

However, implementation of the imbedded predictor/whitener as a bank of finite-impulse-response (FIR) filters or equivalent table look-up operations, e.g. by means of random access memory (RAM), demands a certain level of complexity of the NPML hardware realization. A further difficulty with presently available implementation technologies is the time constraint imposed by high speed clock requirements.

Application of the Viterbi algorithm to channels represented by an IIR (Infinite Impulse Response) discrete-time equivalent model has been studied in a publication by A. Duel Hallen et al. "Delayed decision-feedback sequence estimation," IEEE Trans. Commun., COM-37, pp.428–436, May 1989. The approach in that reference assumes a decision feedback equalization prefilter whose feedback filter is an IIR filter combined with Viterbi detection. In contrast, the present invention considers a forward partial-response or generalized partial-response linear equalizer and a noise whitening IIR predictor imbedded into the Viterbi detector.

OBJECTS OF THE INVENTION

It is a main object of present invention to provide a more efficient and simpler realization of the noise prediction/whitening mechanism for a NPML detector.

It is a further object of the invention to devise a partial-response maximum likelihood detection scheme that utilizes past decisions from the path memory of the Viterbi detector for the noise prediction process.

Another object of the invention is to enable additional mechanisms for a maximum likelihood detector which allow compensation of reading head asymmetries and of DC offset in the receiver.

SUMMARY OF THE INVENTION

The invention provides a partial-response signaling, maximum likelihood detector with an infinite impulse response (IIR) noise predictor and whitening filter imbedded in the Viterbi detector (INPML). As an additional feature, a DC (zero frequency) notch filter may be provided for DC offset compensation. Furthermore, an additional compensation method can be provided that is imbedded in the branch metric computation of the INPML detector for dynamic signal-asymmetry and DC offset compensation.

Advantages of the invention are that, besides its simplicity in implementation, it does not compromise performance of the detector. It has the further important advantage that it can be "piggy-backed" on existing PRML systems so that there is no need for development and implementation of an entirely new channel architecture which would be a complex and costly task. The addition of a DC-notch filter or DC compensation method renders the INPML detector completely immune to DC offset, tolerant and robust against various types of non-linearity and in particular head asymmetry, and tolerant to thermal asperities, which is a further impairment in digital magnetic recording systems.

In the following, embodiments of the invention are described with reference to the drawings.

DETAILED DESCRIPTION OF THE PREFERRED EMBODIMENTS

Figure 1:
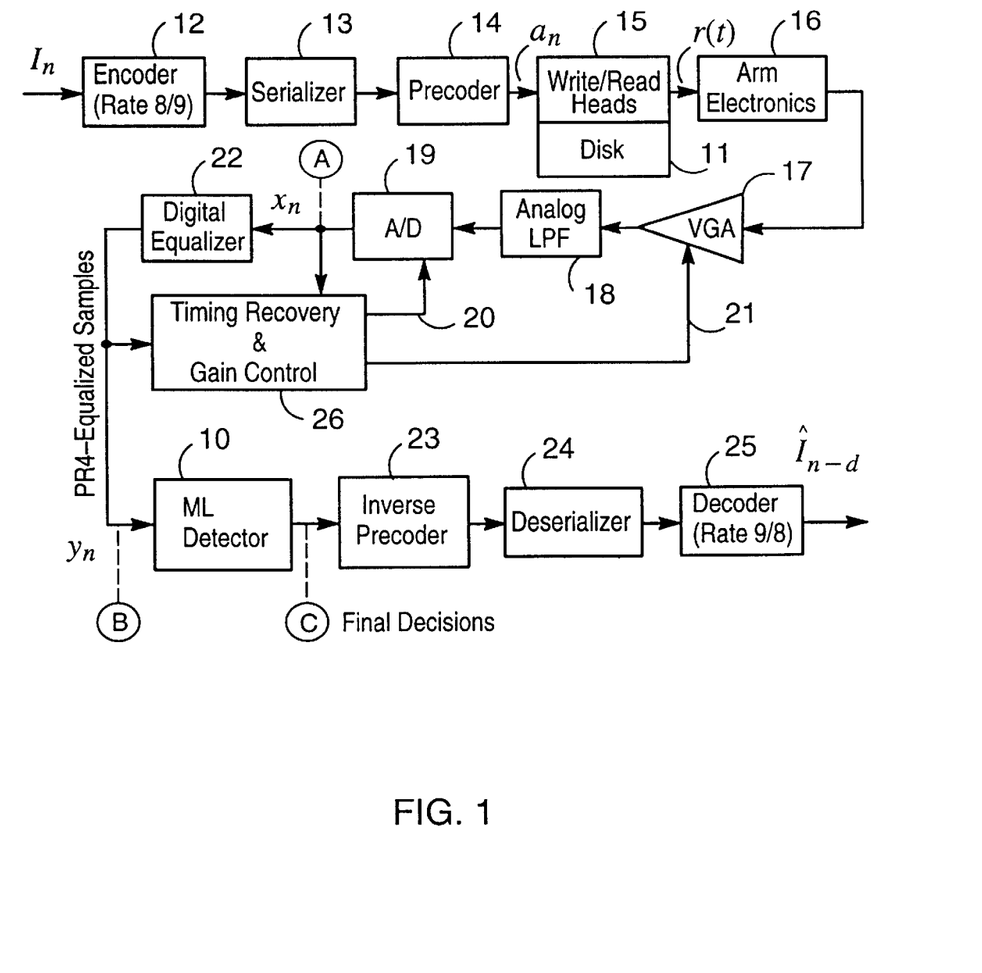
FIG. 1 is a block diagram of a PRML detector in which present invention can be implemented.

FIG. 1 is the block diagram of a known PRML channel architecture for a data recording system. Such a system was also described in the above mentioned International Patent Application PCT/WO97/11544.

Customer data $I_n$ are written in the form of binary digits $\alpha_n \in \{-1, +1\}$ by write head 15 on the disk 11 after being encoded in an encoder 12 by a rate-8/9 RLL (Run Length Limited) code and serialized in a serializer 13 and precoded in a precoder 14 by a operation where D is the unit delay operator and ⊕ means addition modulo 2. When receiving the customer data from said disk 11, an analog signal r(t) is generated by the read head 15 and provided at the read head's output. The signal r(t) is then applied via arm electronic circuitry 16 to a variable gain amplifier (VGA) circuit 17. The output signal of the VGA circuit 17 is first low-pass filtered using an analog low-pass filter 18 (LPF) and then converted to a digital form $X_n$ by an analog-to-digital (A/D) converter 19. The functions of the A/D converter 19 and VGA amplifier 17 are controlled by the timing recovery and gain control loops 20/26 and 21/26, respectively. The analog low-pass filter 18 is preferably a filter which boosts the higher frequencies to avoid saturation of the A/D converter 19 and to support the digital equalizer 22. The digital samples $x_n$ at the output of the A/D converter 19 (line labeled A in FIG. 1) are first shaped to PR4 signal samples by the digital equalizer 22 (line labeled B in FIG. 1) and are then passed on to a maximum likelihood detector circuitry 10 (ML detector) in the form of digital noisy samples $y_n$. The output data of the ML detector 10 (i.e. the final decisions on the line labeled C in FIG. 1), after inverse precoding by means of an inverse precoder 23 performing a $I \oplus D^2$ operation, are fed via a deserializer 24 to a rate 9/8 decoder 25 for the rate-8/9 RLL code which delivers the retrieved customer data $\hat{I}_{n-d}$. The inverse precoder function 23 following the ML detector in FIG. 1 can be a separate functional block (as shown) or it can be imbedded in the trellis (survivor path memory) of the ML detector.

In the above mentioned International Patent Application PCT/WO97/11544, the maximum likelihood detector 10 was a noise-predictive maximum likelihood detector (NPML detector) which uses a finite impulse response (FIR) filter/predictor to estimate the noise contents of the input signals.

Present invention provides an improvement for the maximum likelihood detector portion of a PRML data recording channel. Its principles are shown in the block diagram of FIG. 2A which represents the ML detector portion 10 of FIG. 1. The PR4-equalized samples $y_n$ appearing on line 30 (marked B) are modified by the noise prediction process according to the invention, fed as samples $Z_n$ to the Viterbi detector 31 which on its output 32 delivers the recovered data symbols $\hat{\alpha}_{n-d}$, which are the delayed final decisions (marked C) of the Viterbi detector. Preliminary symbols (path history decisions) $\hat{\alpha}_n$ are delivered on an output 33 of the Viterbi detector. These preliminary symbols are fed to a reconstruction means 34 having transfer function $I-D^2$, to obtain on line 29 a reconstructed sample sequence ($\hat{\alpha}_n - \hat{\alpha}_{n-2}$). This reconstructed sample sequence is subtracted in subtracting means 39 from the noisy equalized samples $y_n$ appearing on branch line 38, to obtain noise samples $\hat{W}_n$ on line 28. These noise samples $\hat{W}_n$ are fed to noise predictor circuit 35 which is an infinite impulse response (IIR) filter. The predicted noise samples $\overline{W}_n$ appearing on output line 36 are combined in circuit 37 with the noisy samples $y_n$ to provide samples $Z_n$ for input to the Viterbi detector 31. Note that the noise prediction and metric update operations are performed separately for each state using decisions from the corresponding path memory. These per state operations in the resulting INPML detector are symbolized in FIG. 2 by double signal flow lines.

Figure 2A:
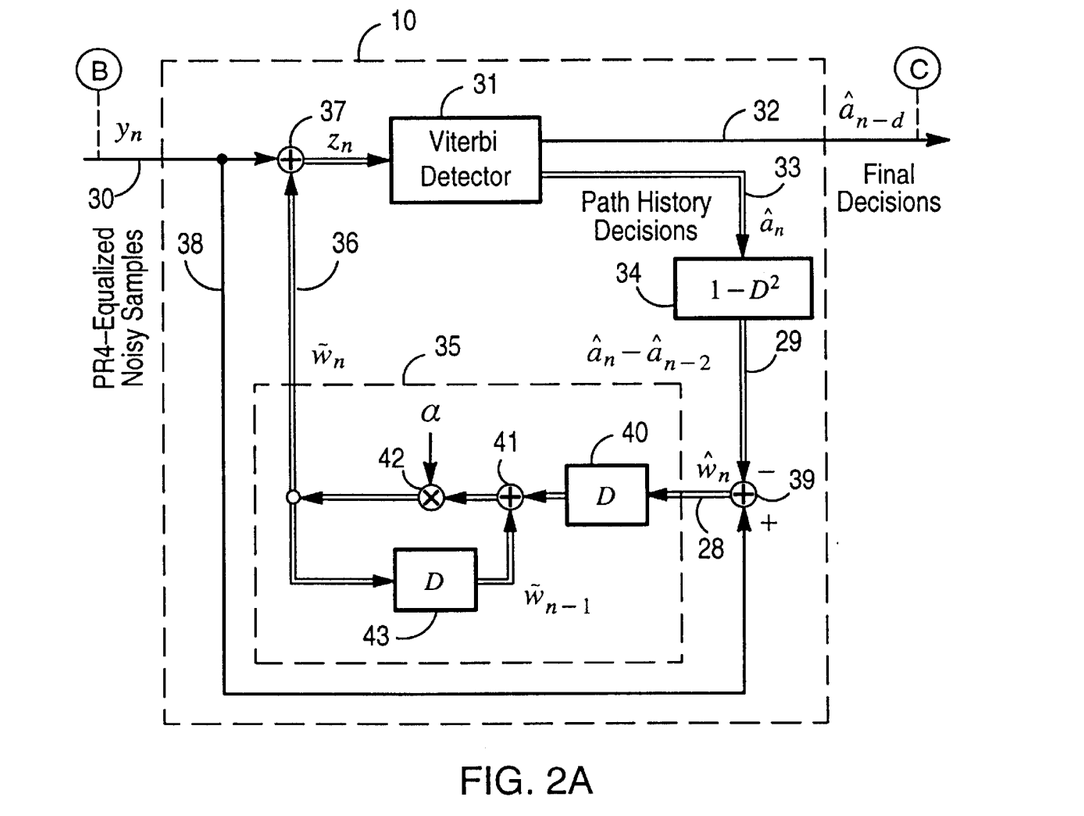
FIG. 2A is a block diagram of the maximum likelihood detector according to the invention with a single-pole imbedded IIR noise predictor.

The IIR predictor 35 of present preferred embodiment is a single-pole device. It receives the noise samples $\hat{W}_n$ on line 28, which then are delayed in unit delay means 40. Its output, after combination with a delayed noise signal (output of unit delay means 43) in adder 41 and multiplication by a coefficient a in multiplication means 42, provides the desired noise signal $\overline{W}_n$ on line 36. The IIR noise predictor 35 executes the transfer function $\alpha D/(I-\alpha D)$.

Thus, the noise predictor is an infinite impulse response device which is imbedded (for each state) into the maximum likelihood detection arrangement, as shown in FIG. 2A. This arrangement will be termed INPML detector in the following (for "Infinite impulse response Noise Predictive Maximum Likelihood" detector). Its operation is described in the sequel.

Let $y_n$ be the output of the PR4 digital equalizer, line labeled B in FIG. 1 and FIG. 2A. This output then consists of a PR4 data signal, with noiseless nominal values of $-2, 0, +2$, and colored noise, i.e., $$Y_n = \alpha_n - \alpha_{n-2} + W_n \tag{1}$$

where $\alpha_n \in \{1, +1\}$ denotes the encoded/precoded data sequence written on the magnetic medium with a rate 1/T and $w_n$ represents the colored noise sequence at the output of the digital partial-response equalizer (T is the channel encoded bit time interval and subscript n indicates time instant nT). The power of the colored noise component $w_n$ in (1) can be reduced by noise prediction.

FIG. 2A shows the basic concept of a single coefficient IIR predictor imbedded into the Viterbi detector. The basic principle can be explained as follows. Let $$E(D) = \frac{1}{1-\alpha D}, \alpha < 1 \tag{2}$$

denote the D-transform of the single-pole IIR prediction error (whitening) filter. Then, assuming ideal path history decisions $\hat{\alpha}_n$, i.e., $\hat{w}_n = w_n$ on line 28, the D-transform of the whitened noise sequence at the output of E(D) is given by $$e(D) = \frac{1}{1-\alpha D} w(D) = [1 + P(D)]w(D) = w(D) + \overline{w}(D), \tag{3}$$

with $$P(D) = \frac{\alpha D}{1-\alpha D}. \tag{4}$$

w(D) in (3) represents the D-transform of the colored noise sequence in (1) and $\overline{e}$ denotes predicted value through the single-pole prediction filter. In the time domain $\bar{w}(D)$ satisfies the following recursive equation $$\bar{w}_n = \alpha(\bar{w}_{n-1} + w_{n-1}) = \alpha\bar{w}_{n-1} + \alpha(y_{n-1} - \alpha_{n-1} + \alpha_{n-3}) = \alpha e_{n-1}. \quad (5)$$

Figure 2B:
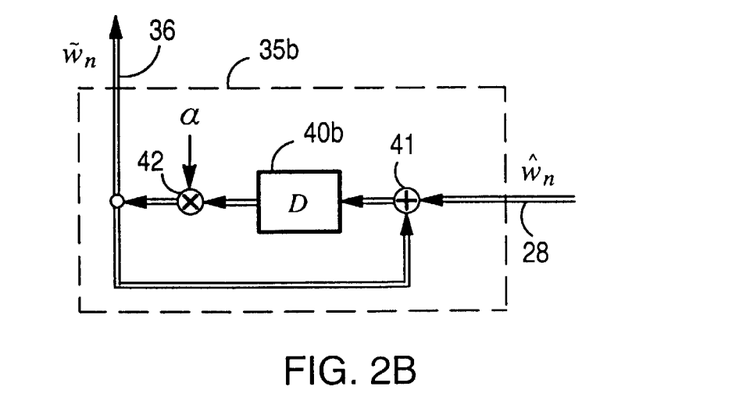
FIG. 2B shows an alternative, equivalent implementation of the IIR noise predictor for the inventive maximum likelihood detector of FIG. 2A.

The single-pole IIR predictor filter 35 described by (4) and (5) and shown in FIG. 2A can also be implemented as shown in FIG. 2B. This IIR predictor 35b also receives noise samples $\bar{w}_n$ on line 28. They are combined in adder 41 with predicted noise samples $\bar{w}_n$, then delayed by unit delay element (D) 40b and then multiplied in multiplication means 42 by a coefficient $\alpha$, to provide predicted noise samples $\bar{w}_n$ on output line 36.

Equation (5) and PR4 signalling define a 4-state ML detector which encompasses a single-pole IIR predictor. If $s_j$, $j=0, 1, 2, 3$, denotes the j-th state $(\alpha_{n-1}, \alpha_{n-2})$ of the 4-state PR4 trellis then, in view of (1) and (3), the branch metric at time nT of the Viterbi detector corresponding to the state transition $s_j \to S_k$ takes the form $$\lambda_n(S_j, s_k) = [y_n - \alpha_n + \alpha_{n-2}(S_j) + \bar{w}_n(S_j)]^2 = [e_n(S_j, S_k)]^2, \quad (6)$$

where $\alpha_n$ and $\alpha_{n-2}(s_j)$ are determined by the hypothesized state transition $s_j \to S_k$ and $\bar{w}_n(S_j)$ is the predicted noise sample associated with state $s_j$. In particular, the reconstructed PR4 samples $(\alpha_{n-1} - \alpha_{n-3})$ in (5) are replaced in practice by $(\hat{\alpha}_{n-1} - \hat{\alpha}_{n-3})$ which are obtained from the path memory of the Viterbi detector associated with state $s_j$.

Figure 3:
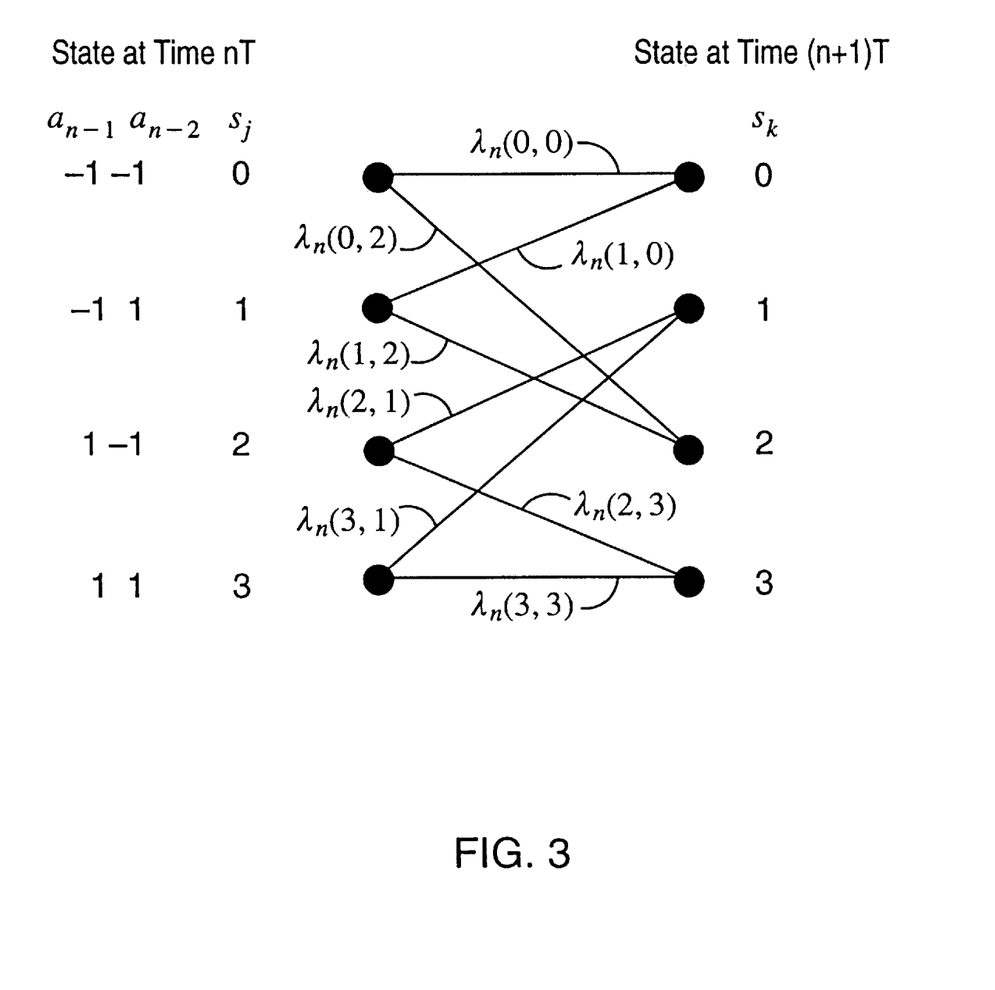
FIG. 3 shows the 4-state trellis for the INPML detector of FIG. 2A.

The 4-state INPML detector with a single-pole IIR predictor/whitening filter operates on the trellis shown in FIG. 3. Every state at time instant nT is associated with State Metrics: $J_n(0), J_n(1), J_n(2), J_n(3)$, Noise Estimates: $\bar{W}_n(0), \bar{W}_n(1), \bar{W}_n(2), \bar{W}_n(3)$.

Figure 5:
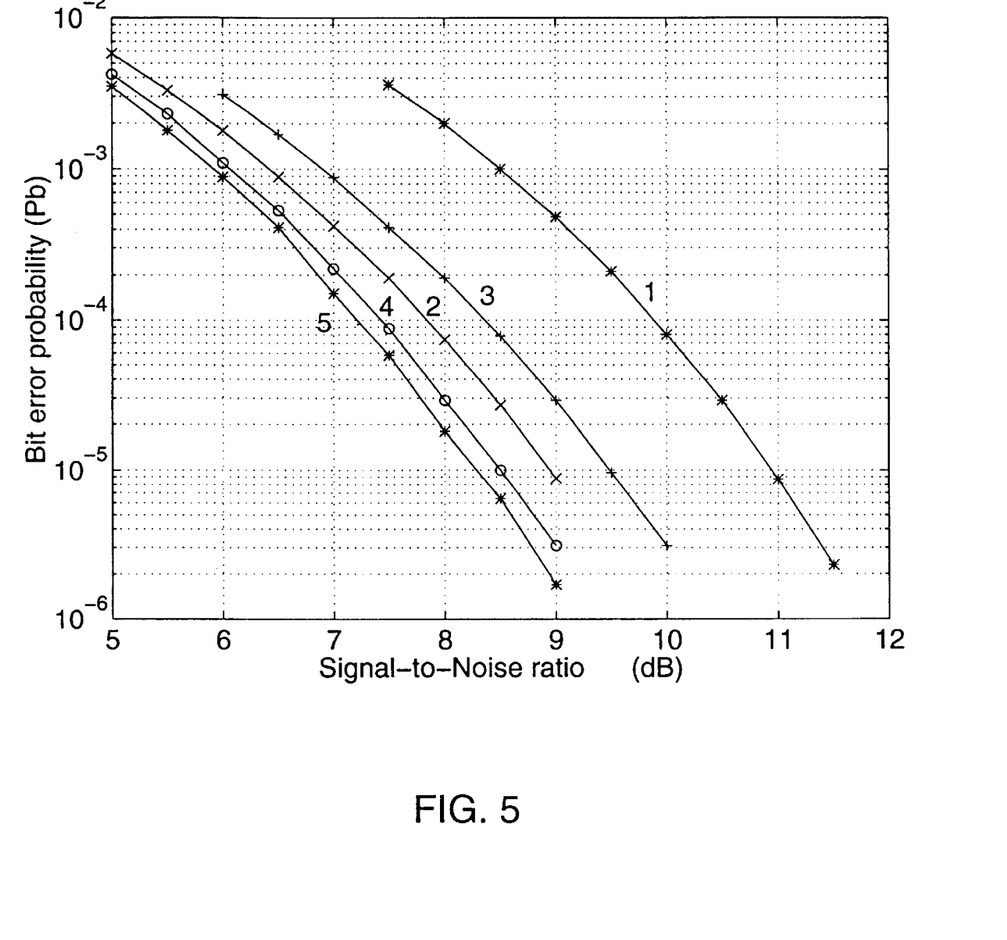
FIG. 5 shows the bit error probability for various ML detectors including the INPML detector of the invention for a channel with the normalized linear recording density PW50/T≅2.86.

The branch metrics shown on the trellis branches of FIG. 5 are computed as follows:

$$\lambda_n(0, 0) = |e_n(0, 0)|^2, \text{ where } e_n(0, 0) = y_n + \tilde{w}_n(0) \quad (7)$$

$$\lambda_n(1, 0) = |e_n(1, 0)|^2, \text{ where } e_n(1, 0) = y_n + 2 + \tilde{w}_n(1)$$

$$\lambda_n(2, 1) = |e_n(2, 1)|^2, \text{ where } e_n(2, 1) = y_n + \tilde{w}_n(2)$$

$$\lambda_n(3, 1) = |e_n(3, 1)|^2, \text{ where } e_n(3, 1) = y_n + 2 + \tilde{w}_n(3)$$

$$\lambda_n(0, 2) = |e_n(0, 2)|^2, \text{ where } e_n(0, 2) = y_n - 2 + \tilde{w}_n(0)$$

$$\lambda_n(1, 2) = |e_n(1, 2)|^2, \text{ where } e_n(1, 2) = y_n + \tilde{w}_n(1)$$

$$\lambda_n(2, 3) = |e_n(2, 3)|^2, \text{ where } e_n(2, 3) = y_n - 2 + \tilde{w}_n(2)$$

$$\lambda_n(3, 3) = |e_n(3, 3)|^2, \text{ where } e_n(3, 3) = y_n + \tilde{w}_n(3)$$

The state metrics and noise estimates at the next time instant (n+I)T are computed as follows:

$$J_{n+1}(0) = \min\{J_n(0) + \lambda_n(0, 0), J_n(1) + \lambda_n(1, 0)\}$$

$$\tilde{w}_{n+1}(0) = \begin{cases} \alpha\, e_n(0, 0) \\ \text{or} \\ \alpha\, e_n(1, 0) \end{cases} \text{Depending on whether state 0 or state 1 was the previous "winning" state}$$

$$J_{n+1}(1) = \min\{J_n(2) + \lambda_n(2, 1), J_n(3) + \lambda_n(3, 1)\}$$

$$\tilde{w}_{n+1}(1) = \begin{cases} \alpha\, e_n(2, 1) \\ \text{or} \\ \alpha\, e_n(3, 1) \end{cases} \text{Depending on whether state 2 or state 3 was the previous "winning" state}$$

$$J_{n+1}(2) = \min\{J_n(0) + \lambda_n(0, 2), J_n(1) + \lambda_n(1, 2)\}$$

$$\tilde{w}_{n+1}(2) = \begin{cases} \alpha\, e_n(0, 2) \\ \text{or} \\ \alpha\, e_n(1, 2) \end{cases} \text{Depending on whether state 0 or state 1 was the previous "winning" state}$$

$$J_{n+1}(3) = \min\{J_n(2) + \lambda_n(2, 3), J_n(3) + \lambda_n(3, 3)\}$$

$$\tilde{w}_{n+1}(3) = \begin{cases} \alpha\, e_n(2, 3) \\ \text{or} \\ \alpha\, e_n(3, 3) \end{cases} \text{Depending on whether state 2 or state 3 was the previous "winning" state}$$

By setting $\alpha=0$ the INPML detector becomes a conventional 4-state PRML detector.

An alternative embodiment of the noise predictor in the inventive INPML detector is now described with reference to the block diagram of FIG. 4. In this case the prediction error (whitening) filter includes two poles and two zeros.

Figure 4:
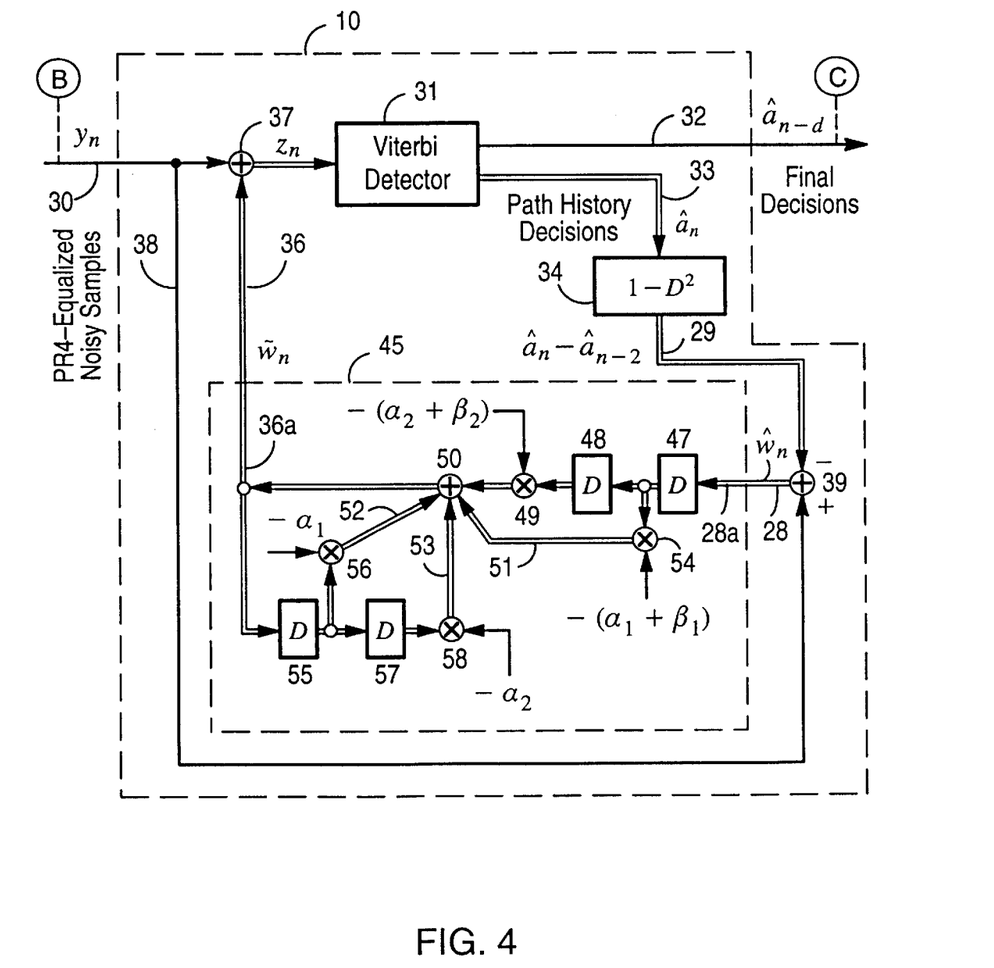
FIG. 4 is a block diagram of an alternative maximum likelihood detector in accordance with the invention in which an imbedded IIR noise predictor with 2 poles and 2 zeros is provided.

The predictor 45 shown in FIG. 4 has the same connections to the other portions of the Viterbi detector as predictor 35 in FIG. 2A: A line 28a (28) transferring noise samples $\hat{w}_n$, and a line 36a (36) for the predicted noise samples $\bar{W}_n$.

The noise samples $\hat{w}_n$ appearing on input 28a are twice delayed in unit delay elements 47 and 48, then multiplied in multiplier 49 by factor $[-(\alpha_2+\beta_2)]$, and then combined in adder unit 50 with "auxiliary" signals on lines 51, 52, and 53 to provide predicted noise samples $\bar{w}_n$ on line 36a.

The "auxiliary" signals are derived as follows: Signal on line 51 results from multiplying the output of delay unit 47 in multiplier 54 by a factor $[-(\alpha_1+\beta_1)]$ Signal on line 52 results from multiplying predicted noise samples $\bar{W}_n$, delayed in unit delay means 55, by a factor $[-\alpha_1]$ in a multiplier 56. Signal on line 53 results from multiplying predicted noise sample $\bar{W}_n$, twice delayed in unit delay means 55 and 57, by a factor $[-\alpha_2]$ in multiplier 58. IIR noise predictor 45 executes the transfer function $$[-(\alpha_1+\beta_1)D - (\alpha_2+\beta_2)D^2]/[1+\alpha_1 D+\alpha_2 D^2].$$

Let $$E(D) = \frac{1 - \beta_1 D - \beta_2 D^2}{1 + \alpha_1 D + \alpha_2 D^2}, \quad (8)$$

denote the D-transform of the two-poles, two-zeros IIR prediction error (whitening) filter. Then, the D-transform of the whitened noise sequence at the output of E(D) is given by $$e(D) = \frac{1 - \beta_1 D - \beta_2 D^2}{1 + \alpha_1 D + \alpha_2 D^2} w(D) = [1 + P(D)]w(D) = w(D) + \tilde{w}(D), \quad (9)$$

with $$P(D) = \frac{-(\alpha_1 + \beta_1)D - (\alpha_2 + \beta_2)D^2}{1 + \alpha_1 D + \alpha_2 D^2}. \quad (10)$$

w(D) in (9) represents the D-transform of the colored noise sequence in (1) and $\bar{w}(D)$ denotes its predicted value through the 2-poles/2-zeros prediction filter. In the time domain $\overline{w}(D)$ satisfies the following recursive equation $$\overline{w} = -\alpha_1 \overline{w}_{n-1} - \alpha_2 \overline{w}_{n-2} - (\alpha_1 + \beta_1)(y_{n-1} - \alpha_{n-1}\alpha_{n-3})$$

$$-(\alpha_2 + \beta_2)(y_{n-2} - \alpha_{n-2} + \alpha_{n-4}).$$

Equation (11) and PR4 signalling can define a 4-state Viterbi detector which encompasses a 2-zeros/2-poles IIR predictor. If $s_j$, j=0, 1, 2, 3, denotes the j-th state of the 4-state PR4 trellis then, in view of (1) and (9), the branch metric at time nT of the Viterbi detector corresponding to the state transition $s_j \to S_k$ takes the form $$\lambda_n(s_j, s_k) = [y_n - \alpha_n \alpha_{n-2}(s_j) + \overline{w}_n(S_j)]^2 = [e_n(s_j, s_k)]^2, \quad (12)$$

where $\alpha_n$ and $\alpha_{n-2}(s_j)$ are determined by the hypothesized state transition $s_j \to S_k$ and $\overline{w}_n(s_j)$ is a noise estimate associated with state $s_j$. As in the previous embodiment the branch metrics (12) for each state transition can now be computed explicitly from expressions (7) with $\overline{w}_n(s_j)$ according to (11).

Following the same approach, the recursive equation of a 1-zero/2-poles IIR predictor filter with the corresponding branch metric equation can be readily derived ($\beta_2 = 0$ in (8)). Similarly, the recursive equation of a 2-poles IIR predictor filter with the corresponding branch metric equation can also be obtained ($\beta_1 = 0$ and $\beta_2 = 0$ in (8)).

For the magnetic recording channel it has been found that in the entire range of $0.5 \leq PW50/T \leq 3.5$ where PW50 is the pulse width at the 50% amplitude point of the channel's step response and T is the duration of the channel encoded bit, IIR predictors with at most 2 poles and 2 zeros offer the best possible performance irrespective of the noise source, i.e., electronic noise or disk noise, or a combination thereof. In particular, for $0.5 \leq PW50/T \leq 2.7$ the best possible performance is achieved with an IIR predictor consisting of 2 poles and 1 zero, whereas for $2.7 \leq PW50/T \leq 3.5$ best possible performance is achieved with an IIR predictor consisting of 2 poles and 2 zeros. If the dominant noise source is electronic noise then an INPML detector with a single-pole IIR predictor offers already substantial performance gains over PRML detectors in a wide range of linear recording densities.

The error performance of a magnetic recording system employing INPML detection has been studied by computer simulation. FIG. 5 shows bit error probabilities of simulated 4-state INPML and NPML detectors for the channel model with PW50/T≈2.86. Curve 2 shows the performance of INPML4 (4-state INPML) with a single-pole predictor; compared to curves 1 (PRML) and 3 (EPRML), a gain in noise margin of 2 dB and 0.5 dB is obtained, respectively. Curve 4 corresponds to 4-state NPML with N=4 predictor coefficients. Compared to curve 3 an additional gain of 0.4 dB is obtained. Finally, curve 5 corresponds to a 4-state INPML detector with a 2-zeros and 2-poles IIR predictor. Compared to curve 4 an additional 0.2 dB is obtained, and compared to PRML 2.7 dB gain is obtained.

Figure 6:
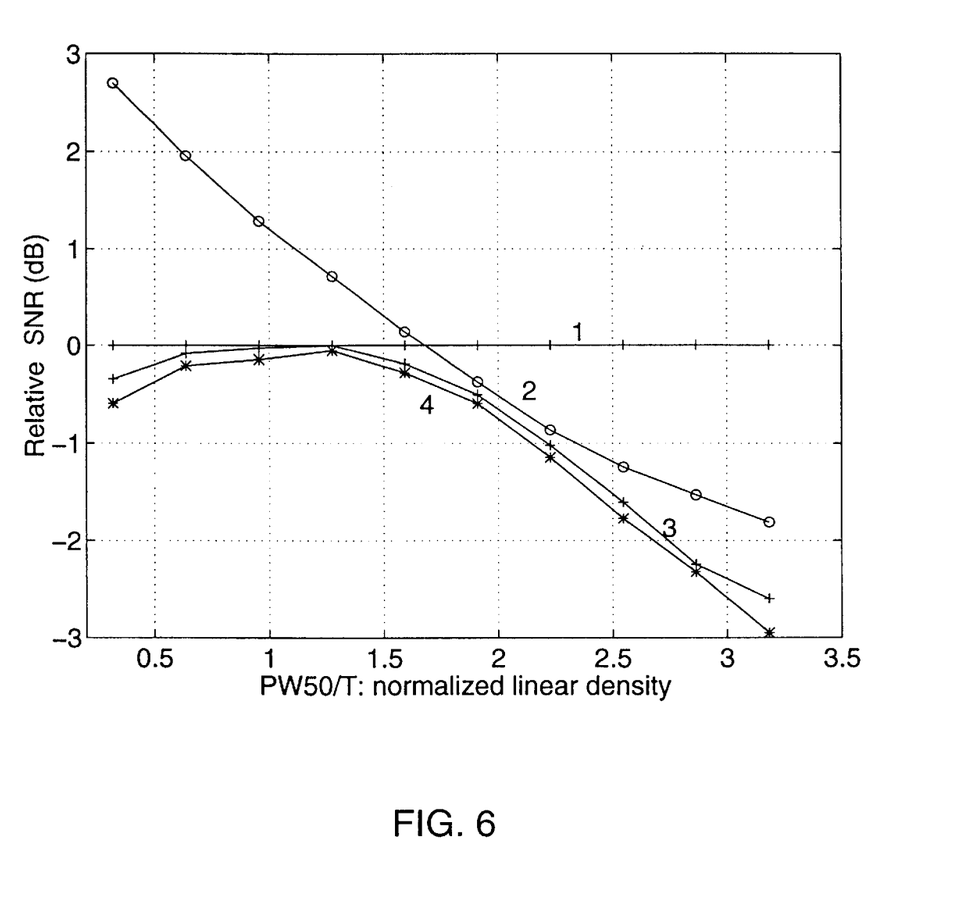
FIG. 6 shows the relative SNR for a given bit error probability, also for various ML detectors including INPML (4 states), as a function of PW50/T.

FIG. 6 shows the relative SNR (Signal-to-Noise Ratio) required to achieve a bit error probability of $P_b = 10^{-5}$ for the 4-state NPML with N=4 predictor coefficients, 4-state INPML with a single-pole IIR predictor, and EPRML, all with respect to a PRML system, as a function of the normalized linear density PW50/T for the Lorentzian channel model. Curve 1 corresponds to our reference PRML system. Curve 2 corresponds to the 8-state EPRML system and curves 3 and 4 correspond to 4-state INPML with a single-pole IIR predictor filter and 4-state NPML/N=4, respectively. We observe that the single-pole INPML system is very close in performance to the NPML system and that both provide superior performance compared to all the other systems at any linear recording density.

Further improvement of the invented INPML detector described so far can be achieved by incorporating a DC-notch filter for eliminating sensitivity to DC offset.

The transfer function of a digital notch filter is given by a second order rational function with two parameters that characterize the location and width of the notch (see article by P. Regalia, S. K. Mitra and P. P. Vaidyanathan "The Digital All-Pass Filter: A Versatile Signal Processing Building Block," *PROCEEDINGS of the IEEE*, VOL.76, pp. 19–37, January 1988). The sensitivity of INPML detectors to DC offset can be eliminated by utilizing such a filter with a notch at DC. It can be seen that the transfer function of a digital DC-notch filter is given by $$H(D) = \frac{1+b}{2}\left[\frac{1-D}{1-bD}\right], \quad (13)$$

where b is a constant that determines the width of the notch. For a very narrow notch at DC, b must be chosen very close to unity. In this case, $(1+b)/2 \approx 1$ and the transfer function of the notch filter simplifies to $$H(D) = \frac{1-D}{1-bD}. \quad (14)$$

Digital filters with a notch at DC are very simple to implement and do not require multipliers. Similarly, the transfer function of a DC-notch analog filter is given by $$H(s) = \frac{s}{s+c}, \quad (15)$$

where c is a constant that determines the width of the notch. For a very narrow notch c must be chosen very close to zero.

Figure 7A:
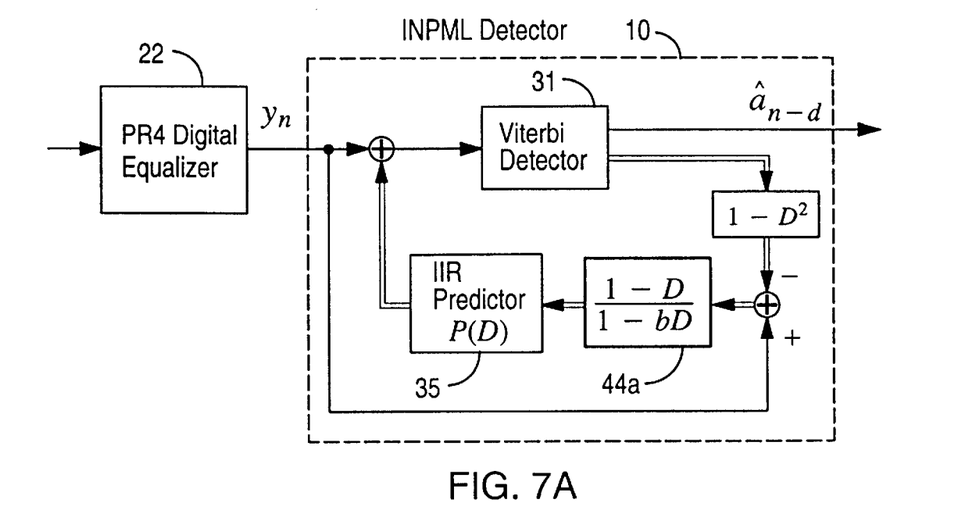
FIG. 7A is a block diagram of an inventive INPML detector with an additional, imbedded DC-notch filter.
Figure 7B:
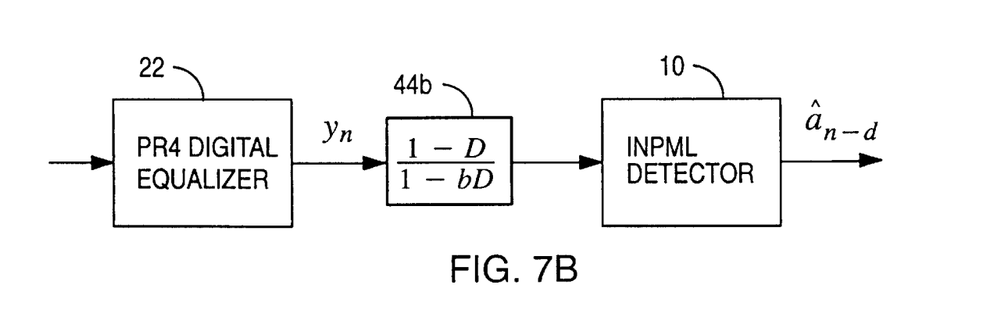
FIG. 7B schematically shows a first arrangement of an INPML detector with a cascaded DC-notch filter (between equalizer and detector).
Figure 7C:
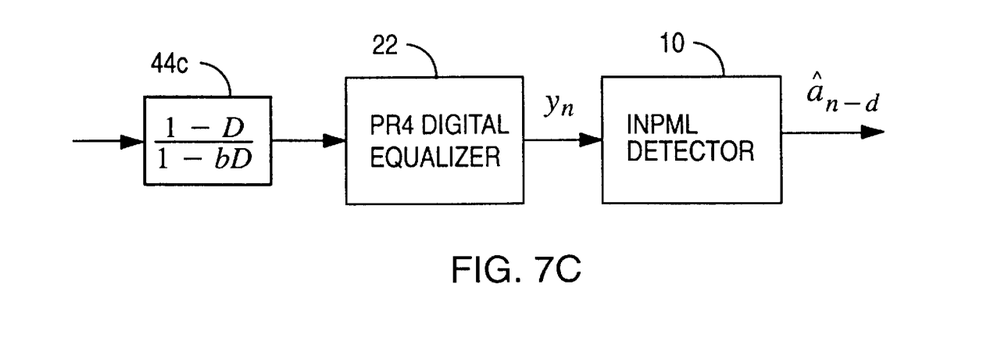
FIG. 7C schematically shows a second arrangement of an INPML detector with a cascaded DC-notch filter (preceding the equalizer).

The DC-notch filter can be either imbedded into the INPML detector as part of the whitening IIR predictor or cascaded with the INPML detector. FIGS. 7A, 7B and 7C show the block diagrams of three possible configurations of an INPML detector with a DC-notch filter. In FIG. 7A, the notch filter 44a is included in the feedback path between the second output of the Viterbi detector 31 and its input, the path which also contains the IIR predictor 35. In the configuration of FIG. 7B, the notch filter 44b is inserted between the digital equalizer 22 and the INPML detector 10, and thus receives the samples $y_n$ at its input. In the case of FIG. 7C, the notch filter 44c precedes the digital equalizer 22. Clearly, the same approach can be applied to other DC sensitive detectors such as NPML, non-adaptive DFE (decision feedback equalizer) and FDTS (fixed delay tree search) detectors. Summarizing, a DC-notch filter renders INPML:

completely immune to DC offset, tolerant to MR (magneto-resistive) head asymmetry, tolerant to thermal asperities.

An MR head is a nonlinear transducer that introduces asymmetry in the readback signal. Positive peaks can differ in amplitude from negative peaks by as much as 30 %. DC insensitive detectors such as PRML and INPML cascaded with a DC-notch filter are quite tolerant to small amounts of head asymmetry and suffer only a small performance degradation. The high losses in performance due to large amounts of head asymmetry can be recovered by an asymmetry estimation/compensation algorithm which is imbedded into the branch-metric computation of the INPML detector. Consider the following generic signal asymmetry model:

$$f(a_n, a_{n-2}) = \begin{bmatrix} F_{+2} \text{ for } a_n = 1 \text{ and } a_{n-2} = -1 \\ F_0 \text{ for } a_n = a_{n-2} \\ F_{-2} \text{ for } a_n = -1 \text{ and } a_{n-2} = 1 \end{bmatrix}$$

Then, the branch metric computations of the 4-state INPML detector whose trellis is shown in FIG. 3 must be modified as follows:

$$\lambda_n(0, 0) = |e_n(0, 0)|^2, \text{ where } e_n(0, 0) = y_n - F_0 + \tilde{w}_n(0)$$

$$\lambda_n(1, 0) = |e_n(1, 0)|^2, \text{ where } e_n(1, 0) = y_n - F_{-2} + 2 + \tilde{w}_n(1)$$

$$\lambda_n(2, 1) = |e_n(2, 1)|^2, \text{ where } e_n(2, 1) = y_n - F_0 + \tilde{w}_n(2)$$

$$\lambda_n(3, 1) = |e_n(3, 1)|^2, \text{ where } e_n(3, 1) = y_n - F_{-2} + \tilde{w}_n(3)$$

$$\lambda_n(0, 2) = |e_n(0, 2)|^2, \text{ where } e_n(0, 2) = y_n - F_{+2} + \tilde{w}_n(0)$$

$$\lambda_n(1, 2) = |e_n(1, 2)|^2, \text{ where } e_n(1, 2) = y_n - F_0 + \tilde{w}_n(1)$$

$$\lambda_n(2, 3) = |e_n(2, 3)|^2, \text{ where } e_n(2, 3) = y_n - F_{+2} + \tilde{w}_n(2)$$

$$\lambda_n(3, 3) = |e_n(3, 3)|^2, \text{ where } e_n(3, 3) = y_n - F_0 + \tilde{w}_n(3)$$

The state metrics and feedback estimates at the next time instant (n+1)T are computed as follows:

$$J_{n+1}(0) = \min\{J_n(0) + \lambda_n(0, 0), J_n(1) + \lambda_n(1, 0)\}$$

$$\tilde{w}_{n+1}(0) = \begin{cases} \alpha \, e_n(0, 0) \\ \text{or} \\ \alpha \, e_n(1, 0) \end{cases} \text{Depending on whether state 0 or state 1 was the previous "winning" state}$$

$$J_{n+1}(1) = \min\{J_n(2) + \lambda_n(2, 1), J_n(3) + \lambda_n(3, 1)\}$$

$$\tilde{w}_{n+1}(1) = \begin{cases} \alpha \, e_n(2, 1) \\ \text{or} \\ \alpha \, e_n(3, 1) \end{cases} \text{Depending on whether state 2 or state 3 was the previous "winning" state}$$

$$J_{n+1}(2) = \min\{J_n(0) + \lambda_n(0, 2), J_n(1) + \lambda_n(1, 2)\}$$

$$\tilde{w}_{n+1}(2) = \begin{cases} \alpha \, e_n(0, 2) \\ \text{or} \\ \alpha \, e_n(1, 2) \end{cases} \text{Depending on whether state 0 or state 1 was the previous "winning" state}$$

$$J_{n+1}(3) = \min\{J_n(2) + \lambda_n(2, 3), J_n(3) + \lambda_n(3, 3)\}$$

$$\tilde{w}_{n+1}(3) = \begin{cases} \alpha \, e_n(2, 3) \\ \text{or} \\ \alpha \, e_n(3, 3) \end{cases} \text{Depending on whether state 2 or state 3 was the previous "winning" state}$$

The values of the nonlinear function $f(\alpha_n, \alpha_{n-2})$ can be estimated for a particular head and media combination during manufacturing and then be used as fixed predetermined values in the branch metric computation unit of the INPML detector.

Figure 8:
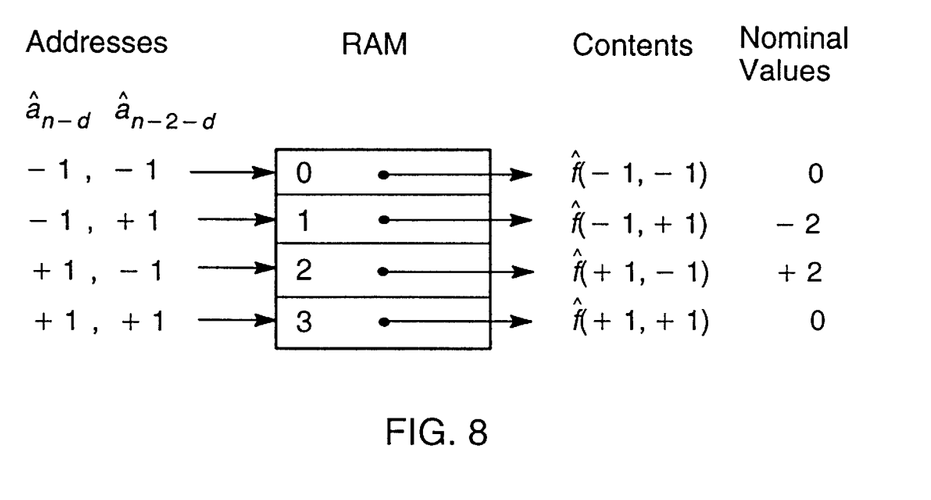
FIG. 8 illustrates a RAM based dynamic non-linearity estimation to be used for DC offset and head asymmetry compensation.

Alternatively, an algorithm that estimates these values dynamically can be used. Dynamic estimation can be achieved by a table look-up stochastic gradient algorithm which updates one memory location per time interval. Consider delayed decisions from the path memory of the INPML detector, say $\hat{\alpha}_{n-d}, \hat{\alpha}_{n-2-d}$. These decisions then form the address to the memory location of a RAM in which the corresponding values are stored. A simple schematic of a RAM with four memory locations containing corresponding values at time nT is shown in FIG. 8. At the next time instant, (n+1)T, the content of the memory location addressed by $(\hat{\alpha}_{n-d}, \hat{\alpha}_{n-2-d})$ is updated according to the following algorithm:

$$\hat{f}_{n+1}(\hat{\alpha}_{n-d}, \hat{\alpha}_{n-2-d}) = \hat{f}_n(\hat{\alpha}_{n-d}, \hat{\alpha}_{n-2-d}) + \mu e_{n-d},$$

$$e_{n-d} = [y_{n-d} - \hat{f}_n(\hat{\alpha}_{n-d}, \hat{\alpha}_{n-2-d})],$$

where $Y_{n-d}$ is the delayed, nonlinearly distorted received signal and $\mu$ is a small constant. The above algorithm can also be applied to remedy other forms of nonlinearity. In general, the number of symbols which the nonlinear function $f(.)$ depends on determines the size of the RAM.

The following asymmetry model has been used in the simulations:

$$f(a_n, a_{n-2}) = \begin{bmatrix} 2 + 4\delta + DC = F_{+2} \text{ for } a_n = 1 \text{ and } a_{n-2} = -1 \\ 0 + DC = F_0 \text{ for } a_n = a_{n-2} \\ -2 + 4\delta + DC = F_{-2} \text{ for } a_n = -1 \text{ and } a_{n-2} = 1. \end{bmatrix}$$

This model is basically a second-order nonlinearity coupled with a DC offset. In the simulations δ=0.1, i.e., 33% asymmetry, and DC =0.05 have been chosen.

Figure 9:
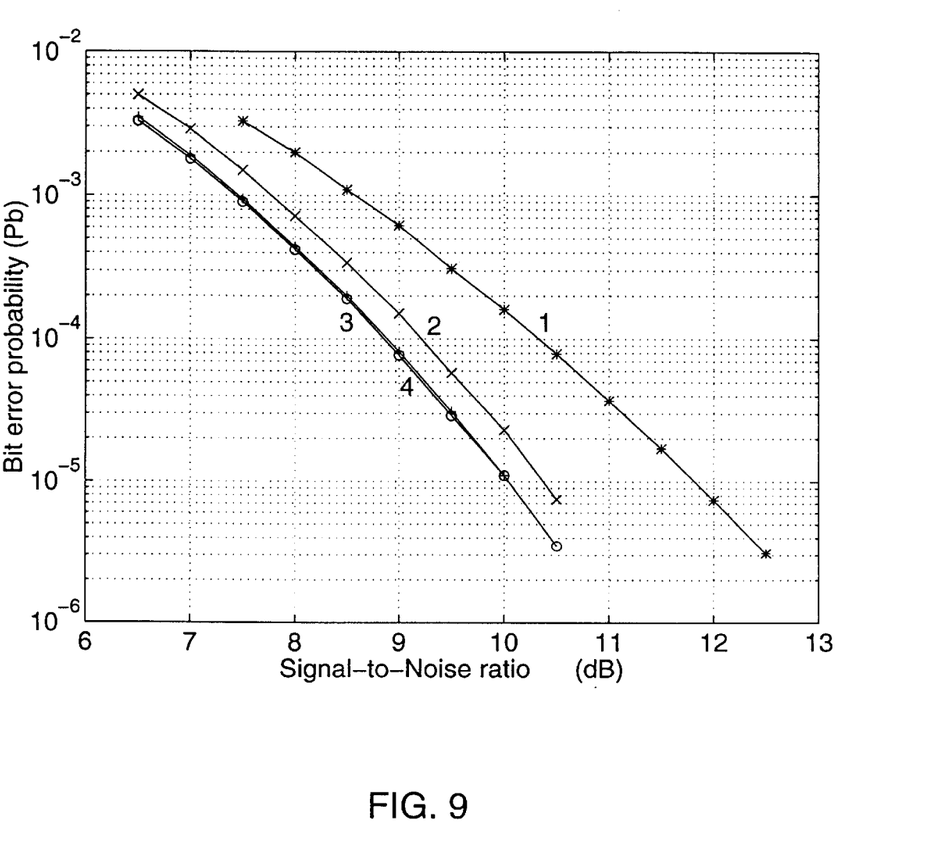
FIG. 9 shows the bit error probability for the INPML detector with and without asymmetry estimation (channel PW50/T≅2.86).

FIG. 9 shows the error performance of a 4-state INPML detector with a single-pole predictor in the presence of electronic noise and head asymmetry for the channel model with PW50/T≈2.86. The head asymmetry is 33%. Curve 1 shows the performance of INPML without any asymmetry compensation. Curves 2 and 3 correspond to INPML combined with adaptive asymmetry estimation and $\mu$=0.05 and $\mu$=0.005, respectively. Finally, curve 4 shows the performance of INPML with ideal asymmetry estimation/compensation. These performance results show that the dynamic estimation methods can achieve the performance of ideal estimates.

Note that, besides a fully digital implementation, the whole or portions of the elements shown in the INPML detector 10 of FIGS. 2A/B, FIG. 4 and FIG. 7, can be implemented in analog circuit technology.

What is claimed is:

1. A detector apparatus for noise-predictive maximum likelihood detection for encoded or uncoded data sequences having passed a partial-response equalizer, comprising:

a maximum likelihood sequence detector; and an infinite impulse response noise predictor providing input to said maximum likelihood sequence detector, said infinite impulse response noise predictor predicting noise as a function of a difference between an input of said detector apparatus and reconstructed samples derived from an output of said maximum likelihood sequence detector;

wherein said infinite impulse response noise predictor executes a transfer function from the set of transfer functions consisting of:

(A) $\alpha D/(1-\alpha D)$, where $\alpha$ is a preselected scaling factor and D is a unit delay operator; and (B) $(-(\alpha_1+\beta_1)D-(\alpha_2+\beta_2)D^2)/(1+\alpha_1 D+\alpha_2 D^2)$, where $\alpha_1, \alpha_2, \beta_1,$ and $\beta_2$ are preselected scaling factors and D is a unit delay operator.

2. The detector apparatus in accordance with claim 1, wherein said infinite impulse response noise predictor includes a single-pole filter comprising:

a filter input for receiving noise samples;

a filter output for providing predicted noise samples;

first unit delay means for producing a first delayed output, said first unit delay means receiving as its input the noise samples;

second unit delay means for producing a second delayed output;

adding means for adding the first delayed output of said first unit delay means and the second delayed output of said second unit delay means; and multiplication means for multiplying the output of said adding means by a constant factor ($\alpha$), furnishing to said filter output the predicted noise samples, and furnishing to said second unit delay means as its input the predicted noise samples.

3. The detector apparatus in accordance with claim 1, wherein said infinite impulse response noise predictor includes a double-pole and double-zero filter comprising:

a filter input for receiving noise samples;

a filter output for providing predicted noise samples;

first and second unit delay means connected in series for respectively producing a first delayed output and a second delayed output, the first unit delay means output receiving as its input the noise samples;

first multiplication means for multiplying the second delayed output of said second unit delay means by a first constant factor $(-(\alpha_1+\beta_1))$;

adding means for adding the output of said first multiplication means and correction terms appearing on further inputs of said adding means, and furnishing to said filter output the predicted noise samples;

third and fourth unit delay means connected in series for respectively producing a third delayed output and a fourth delayed output, the third unit delay means receiving as its input the output of said adding means; and second, third and fourth multiplication means for multiplying the first, third and fourth delayed outputs of said first, third and fourth unit delay means each by a respective constant factor $(-(\alpha_2+\beta_2); -\alpha_1; -\alpha_2)$ and furnishing their outputs to said further inputs of said adding means.

4. The detector apparatus in accordance with claim 2, further comprising:

subtracting means for furnishing the noise samples to said filter input of said infinite impulse response noise predictor, said subtracting means having a first input for receiving reconstructed PR4 samples and a second input for receiving equalized, noisy data samples; said subtracting means furnishing the noise samples based on the difference of the equalized, noisy data samples and the reconstructed PR4 samples.

5. The detector apparatus in accordance with claim 3, further comprising:

subtracting means for furnishing the noise samples to said filter input of said infinite impulse response noise predictor, said subtracting means having a first input for receiving reconstructed PR4 samples and a second input for receiving equalized, noisy data samples; said subtracting means furnishing the noise samples based on the difference of the equalized, noisy data samples and the reconstructed PR4 samples.

6. The detector apparatus in accordance with claim 4, further comprising:

reconstructing means for reconstructing PR4 data samples by a transfer function $1-D^2$, an input of said reconstructing means being connected to an output of said maximum likelihood sequence detector providing path history decisions, and an output of said reconstructing means being connected to said first input of said subtracting means.

7. The detector apparatus in accordance with claim 5, further comprising:

reconstructing means for reconstructing PR4 data samples by a transfer function $1-D^2$, an input of said reconstructing means being connected to an output of said maximum likelihood sequence detector providing path history decisions, and an output of said reconstructing means being connected to said first input of said subtracting means.

8. The detector apparatus in accordance with claim 1, wherein said infinite impulse response noise predictor has a filter function with not more than two poles and not more than two zeros.

9. The detector apparatus in accordance with claim 1, further comprising:

a DC-notch filter, either imbedded in, or cascaded with, said maximum likelihood sequence detector, said DC-notch filter providing DC offset compensation.

10. The detector apparatus in accordance with claim 1, wherein at least a portion of said maximum likelihood sequence detector is implemented in analog circuit technology.

11. The detector apparatus of claim 1, wherein said maximum likelihood sequence detector executes a Viterbi algorithm.

12. A detection method for noise-predictive maximum likelihood detection for encoded or uncoded data sequences having passed a partial-response equalizer, comprising the steps of:

providing a maximum likelihood sequence detection process; and using an infinite impulse response noise prediction procedure to provide input to the maximum likelihood sequence detection process, wherein said infinite impulse response noise prediction procedure comprises the steps of:

filtering the difference between partial-response equalized, noisy samples and reconstructed samples derived from an output of said maximum likelihood sequence detection process; and executing a transfer function to provide predicted noise samples, said transfer function being one of the set of transfer functions consisting of:

(A) $\alpha D/(1-\alpha D)$, where a is a preselected scaling factor and D is a unit delay operator; and (B) $(-(\alpha_1+\beta_1)D-(\alpha_2+\beta_2)D^2)/(1+\alpha_1 D+\alpha_2 D^2)$, where $\alpha_1, \alpha_2, \beta^1$, and $\beta_2$ are preselected scaling factors and D is a unit delay operator.

13. The detection method in accordance with claim 12, wherein said infinite impulse response noise prediction procedure is executed multiple times, once for each state of a trellis of said maximum likelihood sequence detection process.

14. The detection method in accordance with claim 12, further comprising a procedure for DC offset compensation and reading head asymmetry compensation, comprising the steps of:

addressing a memory containing estimates of nonlinearity, using delayed decisions as addresses, and using nonlinearity signal estimate values thus obtained from the memory, in a branch metric computation for each state of said maximum likelihood sequence detection process; and concurrently, updating the nonlinearity signal estimate values contained in the memory, by a stochastic gradient procedure according to $$\hat{f}_{n+1}(\hat{\alpha}_{n-d}, \hat{\alpha}_{n-2-d}) = \hat{f}_n(\hat{\alpha}_{n-d}, \hat{\alpha}_{n-2-d}) + \mu e_{n-d}$$

$$e_{n-d} = y_{n-d} \hat{f}_n(\hat{\alpha}_{n-d}, \hat{\alpha}_{n-2-d}),$$

where $\hat{\alpha}_{n-d}, \hat{\alpha}_{n-2-d}$ are delayed decisions, $Y_{n-d}$ is a delayed, nonlinearly distorted received signal, and p is a small constant.

15. A detector apparatus for a data channel, comprising:
a sampling input receiving digital input samples;
a maximum likelihood sequence detector having an output;
an infinite impulse response noise predictor obtaining input from said sampling input and from said output of said maximum likelihood sequence detector, and having an output of predicted noise, said infinite impulse response noise predictor executing a transfer function from the set of transfer functions consisting of:
(A) $\alpha D/(1-\alpha D)$, where a is a preselected scaling factor and D is a unit delay operator; and
(B) $(-(\alpha_1+\beta_1)D-(\alpha_2+\beta_2)D^2)/(1+\alpha_1 D+\alpha_2 D^2)$, where $\alpha_1, \alpha_2, \beta_1,$ and $B_2$ are preselected scaling factors and D is a unit delay operator; and an adder receiving said sampling input and said output of predicted noise produced by said noise predictor, said adder providing input to said maximum likelihood sequence detector.

16. The detector apparatus of claim 15, wherein said infinite impulse response noise predictor generates multiple predictive noise outputs, each predictive noise output corresponding to a respective state of a trellis of said maximum likelihood sequence detector.

17. The detector apparatus of claim 15, wherein said maximum likelihood sequence detector executes a Viterbi algorithm.

* * * * *